(12) United States Patent
Bergqvist

(10) Patent No.: US 9,049,541 B2
(45) Date of Patent: Jun. 2, 2015

(54) METHOD FOR THE AUTOMATIC MANAGEMENT OF TERMINAL-DEPENDENT INFORMATION

(75) Inventor: Per Bergqvist, Bromma (SE)

(73) Assignee: Synapse International s.a., Luxembourg (LU)

( * ) Notice: Subject to any disclaimer, the term of this patent is extended or adjusted under 35 U.S.C. 154(b) by 558 days.

(21) Appl. No.: 10/518,296

(22) PCT Filed: Jun. 26, 2003

(86) PCT No.: PCT/SE03/01117
§ 371 (c)(1),
(2), (4) Date: Dec. 16, 2004

(87) PCT Pub. No.: WO2004/004390
PCT Pub. Date: Jan. 8, 2004

(65) Prior Publication Data
US 2005/0227727 A1 Oct. 13, 2005

(30) Foreign Application Priority Data
Jun. 26, 2002 (SE) ...................................... 0202003

(51) Int. Cl.
*H04M 1/00* (2006.01)
*H04W 4/02* (2009.01)
*H04W 8/22* (2009.01)

(52) U.S. Cl.
CPC .. *H04W 4/02* (2013.01); *H04W 8/22* (2013.01)

(58) Field of Classification Search
CPC .................................. H04W 8/22; H04W 8/24
USPC ......... 455/551, 466, 433, 456, 432, 419, 435, 455/414, 418, 456.1, 456.3, 414.1, 550.1, 455/552.1
See application file for complete search history.

(56) References Cited

U.S. PATENT DOCUMENTS

| | | | |
|---|---|---|---|
| 6,006,084 A * | 12/1999 | Miller et al. | 455/406 |
| 6,275,692 B1 | 8/2001 | Skog | |
| 6,603,968 B2 * | 8/2003 | Anvekar et al. | 455/433 |
| 6,925,095 B2 * | 8/2005 | Pecen et al. | 370/470 |
| 7,149,545 B2 * | 12/2006 | Hurst et al. | 455/558 |
| 2002/0183074 A1 * | 12/2002 | Delaveau et al. | 455/456 |
| 2003/0027581 A1 * | 2/2003 | Jokinen et al. | 455/456 |
| 2004/0067758 A1 * | 4/2004 | Laiho | 455/456.1 |

FOREIGN PATENT DOCUMENTS

| | | |
|---|---|---|
| JP | 2000-032168 | 1/2000 |
| JP | 2000032168 | 1/2000 |
| WO | 01/03402 | 1/2001 |
| WO | 01/63898 | 8/2001 |
| WO | WO 01/60098 | 8/2001 |
| WO | 01/67679 | 9/2001 |
| WO | 02/17567 A2 | 2/2002 |
| WO | 02/17567 A3 | 2/2002 |

OTHER PUBLICATIONS

English Abstract of JP 2000-032168.

* cited by examiner

*Primary Examiner* — Raymond Dean
(74) *Attorney, Agent, or Firm* — Dykema Gossett PLLC

(57) ABSTRACT

A method for the automatic management of terminal-dependent information in a wireless communication system including the detection of the unique identity for the terminal that the subscriber is currently using; adaptation of information for the type of terminal detected; and presentation of the adapted information on the said terminal.

6 Claims, 7 Drawing Sheets

METHOD FOR THE AUTOMATIC MANAGEMENT OF TERMINAL-DEPENDENT INFORMATION

TECHNICAL AREA

The present invention concerns, according to a first aspect, a method for the automatic management of terminal-dependent information in a wireless communication network.

According to a second aspect, the present invention concerns at least one software product for the automatic management of information in a wireless communication network.

BACKGROUND OF THE INVENTION

Mobile terminals are managed in wireless communication systems such as GSM and UMTS. These terminals satisfy the standards that are required in order to be approved in the communication system, but an ever-increasing part of the functionality is of such a nature that it is either not standardised at all, or at least not standardised in a unified manner. Furthermore, the terminals have different properties with respect to the ability to present information and with respect to the set of services built into the terminal.

Certain parts of the settings relating to services are stored on SIM cards. It is possible for an operator to influence these before the subscription is purchased. The operator cannot normally influence the settings that are stored in the memory of the terminal before the subscriber has purchased the terminal (unless the terminal is intimately packaged with a certain specified subscription).

Furthermore, subscribers change terminals while keeping an existing subscription. It is possible that the new terminal does not have the same abilities as the previous terminal.

Manual configuration of services is generally currently required in order for these to be adapted to a particular type of terminal.

This is often experienced as complicated by many users, and it is considered to be a contributory factor to the fact that certain services are seldom or never used. It is obvious that this is a significant disadvantage with existing solutions.

Each mobile unit in a wireless communication network such as GSM or UMTS has a unique identity. The terminal itself is aware of this identity and it is primarily intended to be used as theft-protection. The network can request the identity from the terminal during communication with the network before further communication is permitted.

This terminal identity, IMEI, contains information about the manufacturer, model number, serial number and, in certain cases, also the current version of software.

There is currently no possibility for an external service (that is, a service outside of BSC/RNC/MSC/SGSN) to request this identity.

SUMMARY OF THE INVENTION

One part of the invention has the purpose of making this identity known to external services on request. The invention describes a number of possible methods for collecting information about the terminal identity.

It is possible that it is undesirable for security reasons to expose the exact information concerning which unique terminal that is being used, and thus general information in the form of properties such as, for example, the model number are generated. The operator can choose, in order to increase the security further, to publish only generic subservices which means that the current terminal of the subscriber never leaves the domain of the operator.

By correlating the identity of the terminal with information that is available in advance concerning the properties of different models, it is possible with the aid of the invention to present information about properties to services, which can automatically adapt information for the relevant terminal.

It is the intention of the present invention to solve the problems described above. This is achieved according to a first aspect with a method for automatic management of terminal-dependent information in a wireless communication network by the following steps:

the detection of the unique identity for the terminal that the subscriber is currently using;

the adaptation of information for the type of terminal detected; and the presentation of the adapted information on the said terminal.

The need for manual configuration of services such that they are adapted to a certain type of terminal is reduced or eliminated with this method. A further advantage of the method is that registration of the terminal type used can be made in a database. This database can be used for tailored information for users with a particular type of terminal.

A further advantage of the method is that it makes it possible to generate stimuli for external services during the exchange of terminal used by a subscriber.

Furthermore, the method makes possible automatic migration of service profiles when the subscriber exchanges the terminal.

A further advantage in this context is obtained if the step of detecting the type of terminal takes place through monitoring and probing signal links.

A further advantage in this context is obtained if the step of detecting the type of terminal takes place through monitoring and probing signal links for the detection of MSISDN-IMSI mapping.

A further advantage in this context is obtained if the method also comprises the steps:

the request by the user of a service via SMS/USSD or conversation;

the exchange of IMEI information between MSC and BSC/RNC or between SGSN and BSC/RNC for the subscriber;

the capture of current IMEI information about the subscriber by probing the signal link;

the detection by an application server of the request;

the request by the application server for terminal properties from the configuration server;

the discovery by the configuration server of a unique subscriber identity either by reading information that is stored locally or by a request to HLR.

the reading by the configuration server of stored IMEI for the subscriber;

the remapping by the configuration server of IMEI to properties;

the return by the configuration server of the properties to the application server; and the transmission of a terminal-dependent configuration to the terminal via SMS or other information channel.

According to one embodiment, a further advantage is obtained if the method further comprises the steps:

the request by the user of a service via SMS/USSD or conversation;

the detection by an application server of the request;

the request by the application server for properties;

the request by the configuration server for IMEI via modified ATI or a new operation involving HLR.

the request by HLR to the terminal for IMEI via MSC/SGSN;

the remapping by the configuration server of IMEI to properties;

the return by the configuration server of the properties to the application server; and the transmission of a terminal-dependent configuration to the terminal via SMS or other information channel.

A further advantage is obtained in this context if the step in which HLR requests IMEI from the terminal occurs in two steps:

the request by HLR to MSC/SGSN for IMEI for the subscriber; and the request by MSC/SGSN to the terminal for IMEI for the subscriber via BSC.

A further advantage is obtained according to one embodiment if the method also comprises the steps:

the request by the application server for properties from the configuration server;

the discovery by the configuration server of the unique subscriber identity either by reading information that is stored locally or by an enquiry to HLR;

the reading by the configuration server of stored IMEI for the subscriber;

the contact by the configuration server to collaborating configuration servers if the IMEI information is not present in the local database, whereby the relevant collaborating configuration servers are determined by a request to HLR;

the remapping by the configuration server of IMEI to properties;

the conversion by the application server of terminal-independent information to terminal-dependent information; and the delivery of terminal-dependent information to the terminal.

A further advantage is obtained in this context if the conversion step takes place based on attributes in the properties.

A second intention of the present invention is to accomplish at least one software product that can be directly loaded into the internal memory of at least one digital computer. The software product, at least one such, comprises software modules in order to carry out the steps according to the method according to the present invention, where the said product or products are run on the said computer, at least one such.

The need for manual configuration of services in order for these to be suitable for a certain type of terminal is reduced or eliminated with this product or products.

A further advantage of the software product is that the registration of the terminal type used can be made in a database. This database can be used for tailored information for users of a certain type of terminal.

A further advantage of the software product is that it makes it possible to generate stimuli to an external service on the exchange of a terminal by a subscriber.

Furthermore, the software product makes automatic migration of service profiles possible when the subscriber exchanges the terminal.

It should be pointed out that when the terms "comprises/comprising" are used in this description, it should be taken to mean the presence of the specified properties, steps or components, but it does not exclude the presence of one or more further properties, parts, steps, components or groups of these.

The embodiments of the invention will now be described with reference to the attached drawings, where:

DETAILED DESCRIPTION OF EMBODIMENTS

A list of abbreviations that are used in this description is given below in order to facilitate understanding of the present invention.

ABBREVIATIONS

Figure 1:
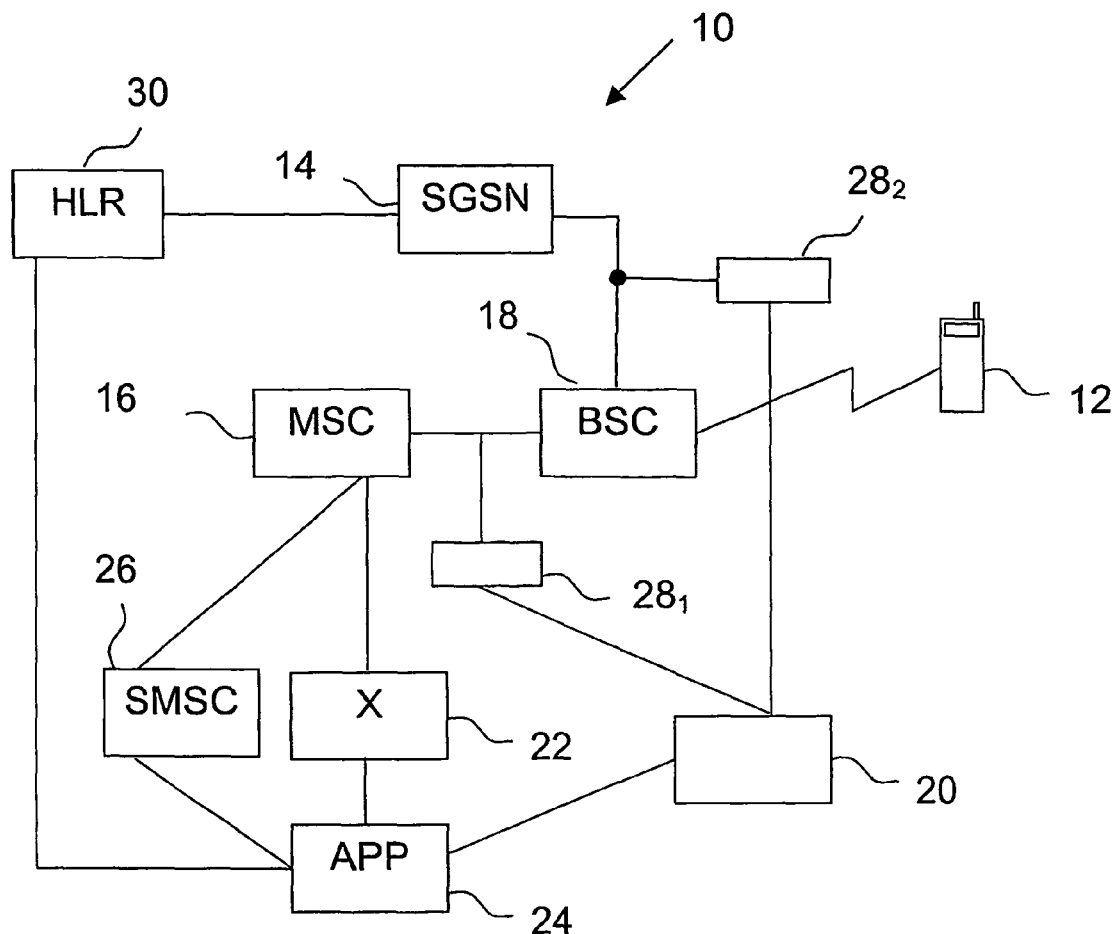
FIG. 1 shows a block diagram of a wireless communication network that can be used to carry out the method according to the present invention.

HLR Home Location Register
MSC Mobile Services Switching Centre
SGSN Service GPRS Support Node
BSC Base Station Controller
RNC Radio Network Controller
SMS Short Message Service
USSD Unstructured Supplementary Service Data
IMEI International Mobile Equipment Identity
MSISDN Mobile Subscriber International Subscriber Directory Number
IMSI International Mobile Subscriber Identity
SIM Subscriber Identity Module
SIM-AT Subscriber Identity Module—Application Toolkit
UMTS Universal Mobile Telephony System
SMSC Short Message Service Centre
VLR Visitor Location Register FIG. 1 shows a wireless communication network 10, which network can be used for execution of the method according to the present invention. The mobile terminal is denoted in FIG. 1 by the reference number 12. The wireless communication network 10 comprises a SGSN-node 14, a BSC/RNC-centre 18 connected to the SGSN-node 14, and an MSC-centre 16 connected to the BSC/RNC-centre 18. The communication network 10 further comprises an SMSC-centre 26 connected to the MSC-centre 16. The communication network 10 further comprises an application server 24 connected to the SMSC-centre 26 and a telephone exchange 22 connected to the MSC-centre 16 and to the application server 24. The communication network 10 further comprises an configuration server 20 connected to the application server 24. The communication network further comprises an HLR-database 30 connected to the application server 24 and to the SGSN-node 14. Finally, the network 10 comprises two probes $28_1$, $28_2$ in order to monitor and probe signal links. These probes $28_1$, $28_2$ are connected to the configuration server 20.

Several configuration servers 20 can be connected together, although this is not shown in FIG. 1. If information about a subscriber is not present in the centre to which the application makes its request, the correct configuration server 20 can be found with the aid of ATI. The request is made from one configuration server to another using a new protocol.

Figure 2:
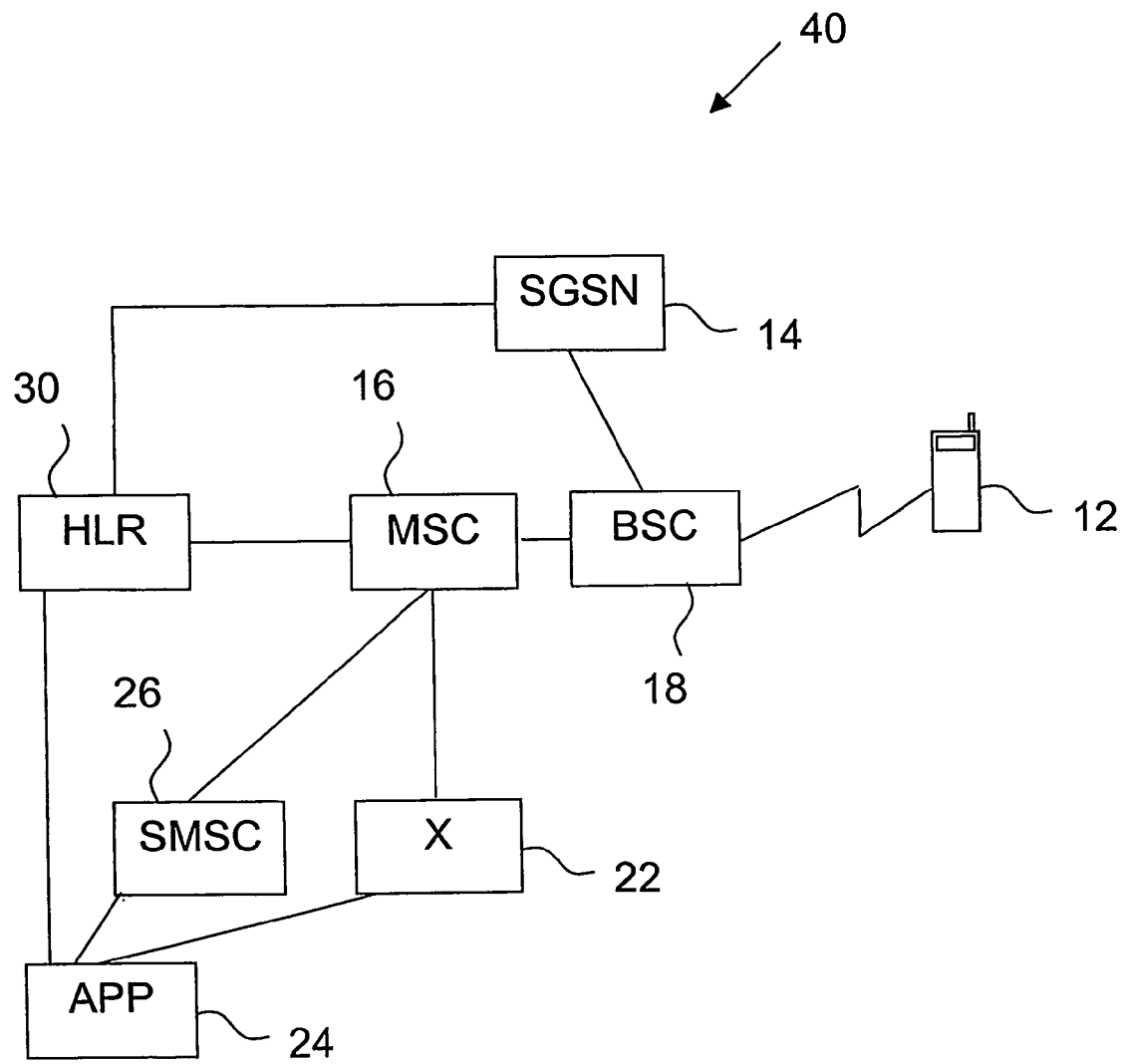
FIG. 2 shows a block diagram of a second embodiment of a wireless communication network that can be used to carry out the method according to the present invention.

FIG. 2 shows a block diagram of a second embodiment of the communication network shown in FIG. 1. Similar components have been denoted in the communication network 40 using the same reference numbers as those used in FIG. 1. These components will not be described further. This network 40 further comprises an HLR database 30 connected to the application server 24 and to the SGSN-node 14. As FIG. 2 makes clear, no probes are included in this embodiment.

It should be pointed out that several of the nodes shown in FIG. 1 and FIG. 2 are optional, and these are not obligatory in order to carry out the method according to the present invention. The obligatory nodes are the BSC/RNC-centre 18, the MSC-centre 16 and the HLR-database 30.

Figure 3:
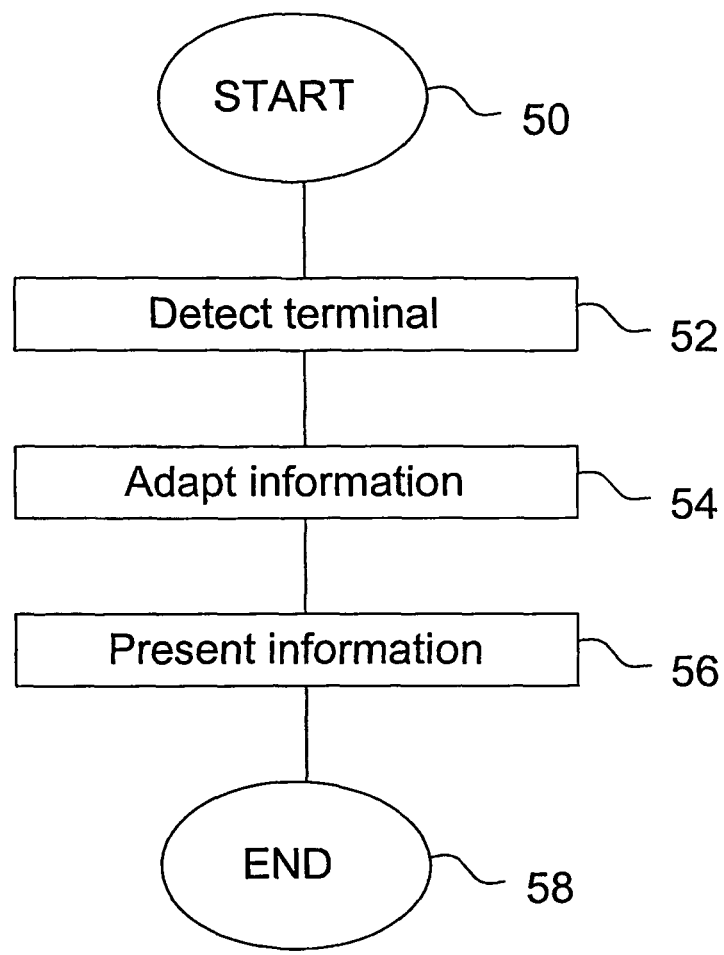
FIG. 3 shows a flow diagram of a first embodiment of a method for the automatic management of terminal-dependent information according to the present invention.

FIG. 3 shows a flow diagram of a method for the automatic management of terminal-dependent information in a wireless network. The method starts at block 50. The method then continues, via block 52, with the step of detecting the type of terminal that the subscriber is currently using. The method then continues, at block 54, with the step of adapting information to the type of terminal detected. The method then continues, at block 56, with the step of presenting the adapted information on the said terminal. The method terminates at block 58.

Figure 4:
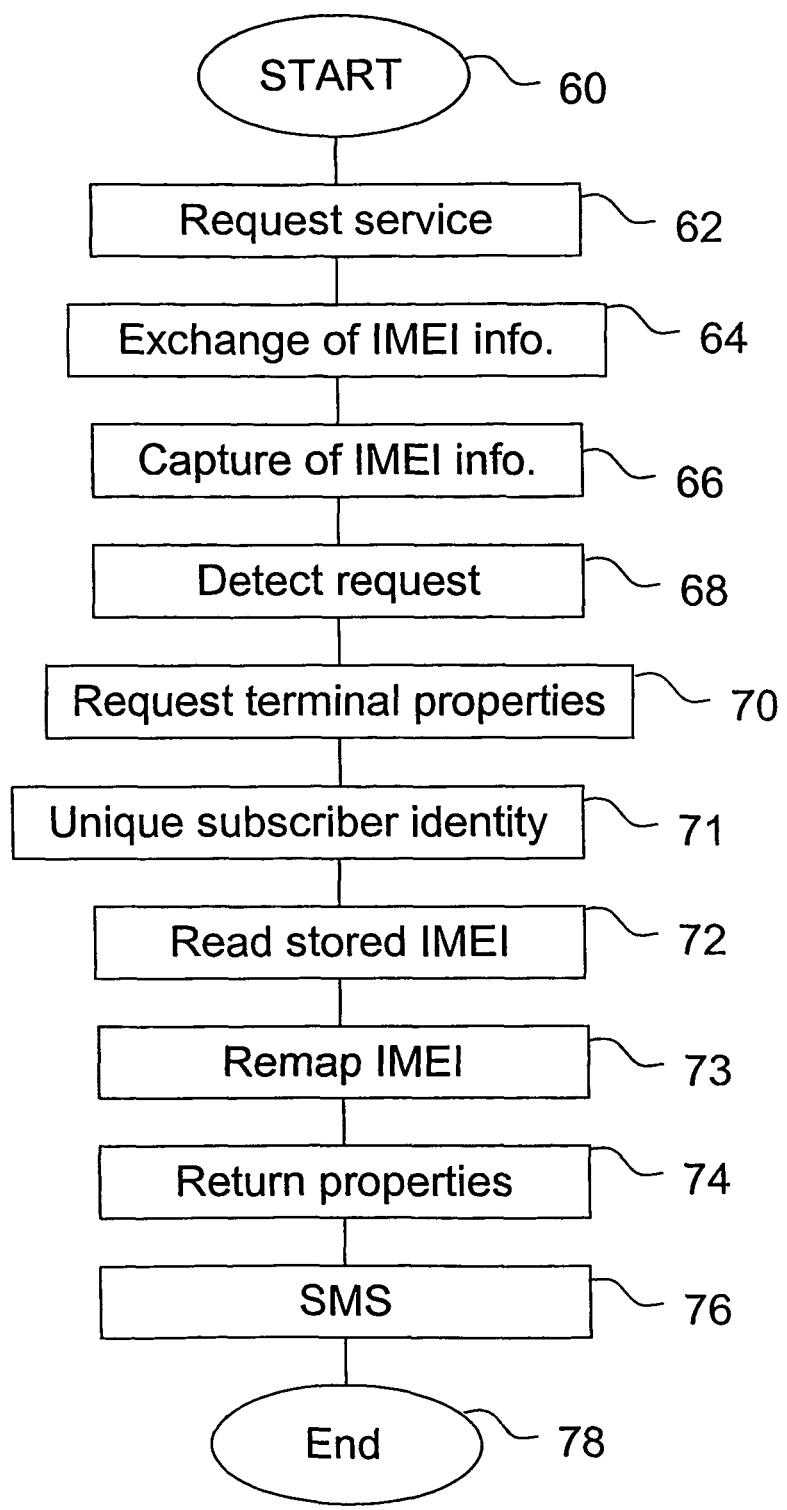
FIG. 4 shows a flow diagram of a second embodiment of the method according to the present invention.

FIG. 4 shows a flow diagram of a further step included in a first variant of the method shown in FIG. 3. The method starts at block 60. The method then continues, at block 62, with the step of the user requesting a service via SMS/USSD or conversation. The method then continues, at block 64, with the step of exchanging IMEI information between MSC and BSC/RNC or between SGSN and BSC/RNC for the subscriber. The method then continues, at block 66, with the step of capturing current IMEI information about the subscriber through probing signal links. The method then continues, at block 68, with the step of an application server detecting the request. The method then continues, at block 70, with the step of the application server requesting terminal properties from the configuration server. The method then continues, at block 71, with the step of the configuration server discovering the unique subscriber identity either by reading information that is stored locally or by a request to HLR. The method then continues, at block 72, with the step of the configuration server reading the stored IMEI for the subscriber. The method then continues, at block 73, with the step of the configuration server remapping the IMEI to properties. The method then continues, at block 74, with the step of the configuration server returning properties to the application server. The method then continues, at block 76, with the step of sending terminal-dependent configuration to the terminal via SMS or another information channel. The method then terminates at block 78.

Figure 5:
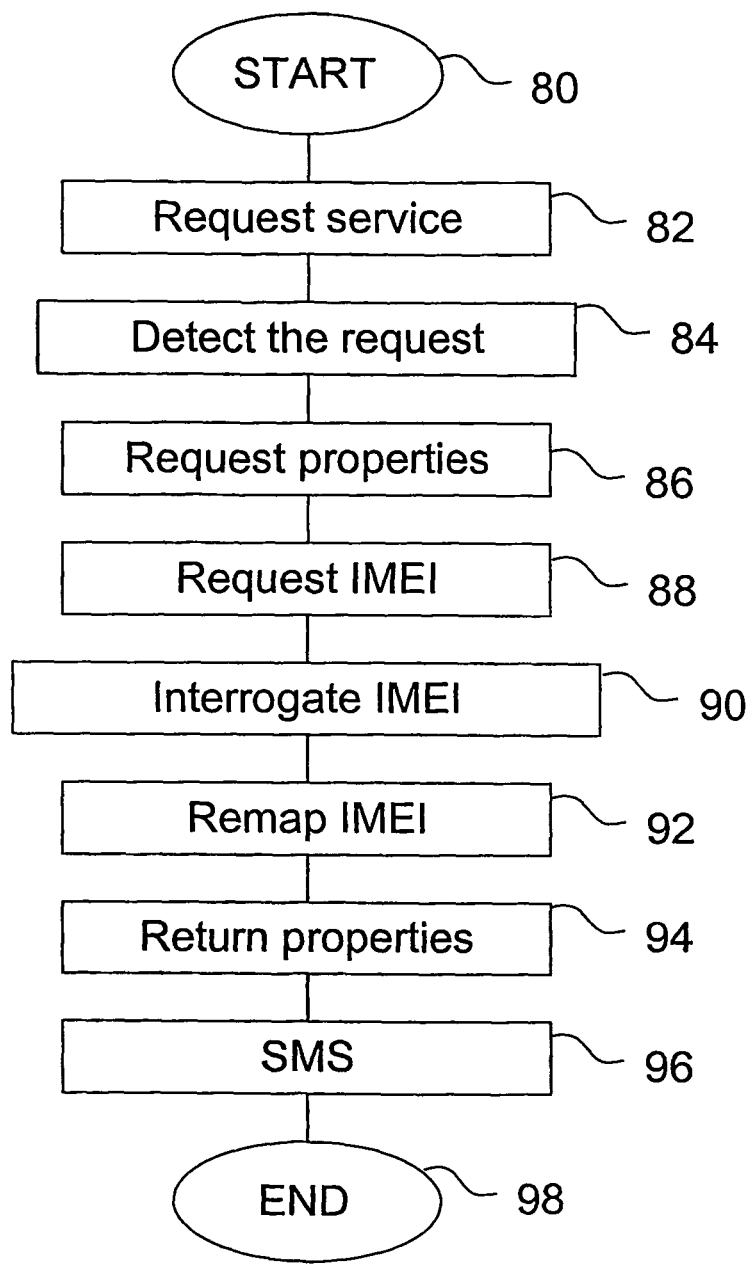
FIG. 5 shows a flow diagram of a third embodiment of the method according to the present invention.

FIG. 5 shows a flow diagram of a further step included in a second variant of the method shown in FIG. 3. The method starts at block 80. The method then continues, at block 82, with the step of the user requesting a service via SMS/USSD or conversation. The method then continues, at block 84, with the step of the application server detecting the request. The method then continues, at block 86, with the request by the application server for properties. The method then continues, at block 88, with the step of the configuration server requesting IMEI via a modified ATI or via a new operation involving the HLR. The method then continues, at block 90, with the step of the HLR requesting IMEI from the terminal via MSC/SGSN. The method then continues, at block 92, with the step of the configuration server remapping the IMEI to properties. The method then continues, at block 94, with the step of the configuration server returning properties to the application server. The method then continues, at block 96, with the step of sending terminal-dependent configuration to the terminal via SMS or another information channel. The method then terminates at block 98.

Figure 6:
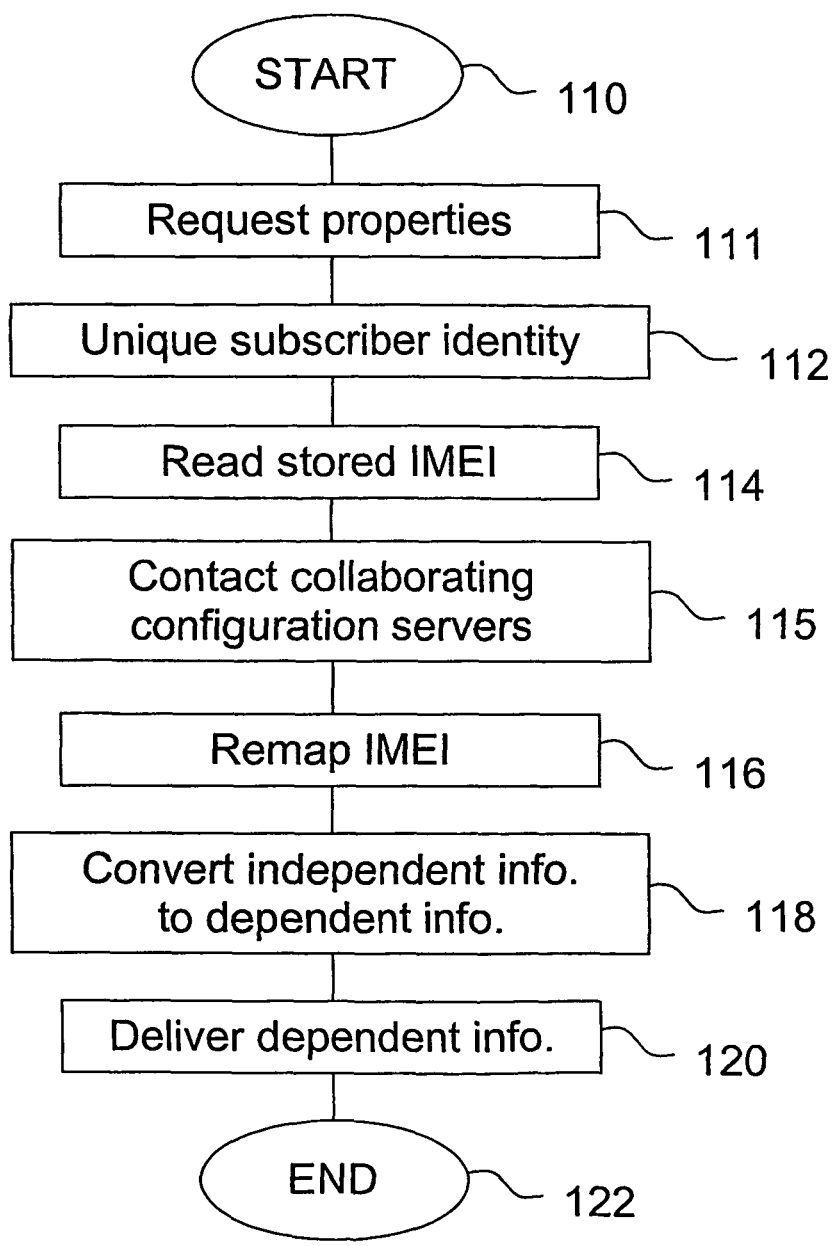
FIG. 6 shows a flow diagram of a fourth embodiment of the method according to the present invention.

FIG. 6 shows a flow diagram of further steps included in a third variant of the method shown in FIG. 3. The method starts at block 110. The method then continues, at block 111, with the step of the application server requesting properties from the configuration server. The method then continues, at block 112, with the step of the configuration server discovering a unique subscriber identity either by reading information that is stored locally or by a request to HLR. The method then continues, at block 114, with the step of the configuration server reading stored IMEI for the subscriber. The method then continues at block 115, with the step of the configuration server contacting collaborating configuration servers if IMEI information is not present in the local database, whereby the relevant collaborating configuration servers are determined through a request to HLR. The method then continues, at block 116, with the step of the configuration server remapping the IMEI to properties. The method then continues, at block 118 with the step of the application server converting terminal-independent information to terminal-dependent information. The method then continues, at block 120, with the step of delivering terminal-dependent information to the terminal. The method terminates at block 122.

Figure 7:
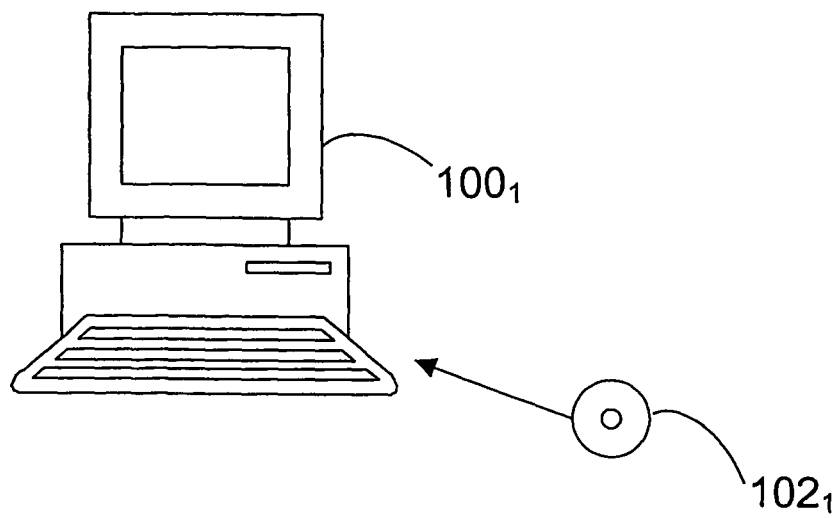
FIG. 7 shows a schematic diagram of some software products according to the present invention.
Figure 7:
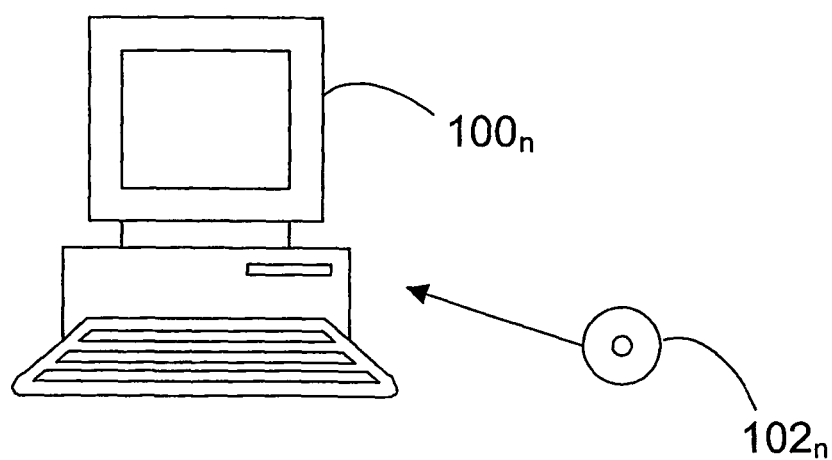

FIG. 7 shows a schematic diagram of some software products according to the present invention. A total of n different software products, $102_1, \ldots, 102_n$, are shown in FIG. 7, where n is an integer. The software products $102_1, \ldots, 102_n$, can be directly loaded into the internal memory of at least one digital computer $100_1, \ldots, 100_n$. FIG. 7 also shows a total of n computers. Each software product $102_1, \ldots, 102_n$ comprises software modules in order to carry out one part of or all of the steps according to FIG. 3 when the product or products $102_1, \ldots, 102_n$, are run on the computer or computers $100_1, \ldots, 100_n$. The software products $102_1, \ldots, 102_n$ may, for example, be in the form of diskettes, RAM-disks, magnetic tapes, optomagnetic disks or any other suitable products.

The invention is not limited to the embodiments described above. It will be clear that many different modifications are possible within the scope of the attached claims.

The invention claimed is:

1. A method for automatic management of terminal-dependent information in a wireless communication network, which method comprises the steps of:
   (a) detecting a unique identity of a terminal that a subscriber is currently using by monitoring and probing signal links, including:
      monitoring and probing a first signal link using a first probe; and
      monitoring and probing a second signal link using a second probe;
   (b) remapping by a configuration server of a unique identity to properties, including type of terminal;
   (c) adapting information about properties to services for the type of terminal detected; and
   (d) presenting the adapted information on the terminal, wherein the first probe and the second probe are connected to the configuration server; the first probe is connected to a mobile services switching centre (MSC) and a base station controller/radio network controller centre (BSC/RNC); and, the second probe is connected to BSC/RNC and a service GPRS support node (SGSN).

2. The method according to claim 1, wherein step (a) comprises MSISDN-IMSI mapping.

3. The method according to claim 1 further comprising the steps of:
requesting by the user of a service via SMS/USSD or conversation; exchanging IMEI information between MSC and BSC/RNC or between SGSN and BSC/RNC for the subscriber;
capturing current IMEI information about the subscriber by probing the signal link;
detecting by an application server of the request,
requesting by the application server for terminal properties from the configuration server;
discovering by the configuration server of a unique subscriber identity either by reading information that is stored locally or by a request to HLR,
reading by the configuration server of stored IMEI for the subscriber;
remapping by the configuration server of IMEI to properties;
returning by the configuration server of the properties to the application server; and
transmitting a terminal-dependent configuration to the terminal via SMS or other information channel.

4. A software product that can be loaded directly into an internal memory of a digital computer comprising software modules for carrying out the steps according to claim 1 when said software product is run on the digital computer.

5. A method for automatic management of terminal-dependent information in a wireless communication network including BSC/RNC, which method comprises the steps of:
(a) detecting a unique identity of a terminal that a subscriber is currently using by monitoring and probing signal links using at least one probe connected to a configuration server;
(b) remapping by the configuration server of a unique identity to properties, including type of terminal;
c) adapting information about properties to services for the type of terminal detected; and
(d) presenting the adapted information on the terminal wherein step (a) comprises monitoring and probing a plurality of signal links using a first probe and a second probe of the at least one probe; the first probe and the second probe are connected to the configuration server; the first probe is connected to MSC and BSC/RNC; and, the second probe is connected to BSC/RNC and SGSN.

6. A method according to claim 5, wherein the plurality of signal links are monitored and probed between the terminal and MSC using the first probe.

* * * * *